United States Patent [19]

Beacham

[11] 4,213,889

[45] Jul. 22, 1980

[54] FLAME RESISTANT RESIN COMPOSITIONS

[75] Inventor: Harry H. Beacham, Langhorne, Pa.

[73] Assignee: FMC Corporation, Philadelphia, Pa.

[21] Appl. No.: 11,739

[22] Filed: Feb. 13, 1979

Related U.S. Application Data

[62] Division of Ser. No. 859,838, Dec. 12, 1977.

[51] Int. Cl.² .............................................. C08K 5/52
[52] U.S. Cl. ..................... 260/45.7 PH; 260/45.85 E; 525/44
[58] Field of Search ............... 260/45.7 PH, 865, 872, 260/45.85 E

[56] References Cited

U.S. PATENT DOCUMENTS 3,758,638  9/1973  Doerge ................................. 260/865

Primary Examiner—V. P. Hoke
Attorney, Agent, or Firm—Robert W. Kell; Frank Ianno

[57] ABSTRACT

Diallyl maleate in combination with alkyl phosphates, including mixed alkyl aryl phosphates, when added to styrene-unsaturated polyester resin systems and cured with a free-radical forming initiator provides a high level of flame resistance.

6 Claims, No Drawings

FLAME RESISTANT RESIN COMPOSITIONS

This is a division, of application Ser. No. 859,838, filed Dec. 12, 1977.

The present invention pertains to flame resistant styrene-unsaturated polyester resin systems and to a method of decreasing the flammability of such styrene-unsaturated polyester resins. More particularly, this invention is directed to styrene-unsaturated polyester resin compositions prepared by reacting a mixture of styrene-polyester resins with diallyl maleate and an alkyl phosphate.

Organic substances containing phosphorus are well known as flame retardants for synthetic plastics, elastomers, fibers, films, etc., as well as for many naturally occurring combustible substances. The effectiveness of organic phosphorus flame retardants varies widely depending on the base substance but, in general, organic phosphorus is not known as a highly active flame retardant element for most synthetic resin systems. Frequently, the amount needed to achieve a high level of flame resistance is excessive and the resin matrix is unable to accommodate the high loading, that is, the resin and high level of organic phosphorus compounds are incompatible and, in addition, all useful mechanical properties are lost through modification with the flame retardant.

Where resin modifiers are of limited effectiveness, it is well known in the art to seek synergists involving combinations of agents to permit the modifiers to be employed at total concentrations which are less than for the individual agents acting alone. Although few synergistic combinations have been definitely established among flame retardants, one couple, namely, the antimony-halogen combinations, is so widely employed that synergism is universally accepted even though there is no general agreement as to mechanism. A similar synergism has recently been reported for molybdenum oxide and ammonium molybdate in combination with halogen. (D. A. Church and F. W. Moore, Plastics Engineering 31, No. 12, December 1975.) Further, molybdenum oxide combined with antimony oxide reportedly exhibits a synergism vs. the individual oxides when all are compared in chlorine containing systems.

Synergistic effects with phosphorus are not as readily evident as with the above metal oxides. Phosphorus plus chlorine generally yields barely additive effects. However, it is becoming recognized that phosphorus plus bromine produces synergistic effects in a number of systems.

Enhancement of flame retardant activity by combinations of materials is not necessarily limited to cases in which both components exercise activity individually. For example, in patents to Badische Anilin and Soda-Fabrik Aktiengesellschaft (U.S. Pat. Nos. 3,420,786 and 3,457,204) certain aromatic hydrocarbons of the type 2,3-dimethyl-2,3-diphenyl-butane and polymeric isopropylarylenes, respectively, are disclosed as strong activators for organic bromine in flame retardant polystyrene compositions.

Phosphoric acid esters have been used as solvents for flameproofing agents such as pentachlorophenol. The application of such solutions to cellulosic products is described in U.S. Pat. No 2,926,096.

The fire resistant properties of epoxyalkyl esters of phosphoric acid are taught in U.S. Pat. No. 3,056,806.

U.S. Pat. No. 3,511,857 discloses flame resistant polyester compositions prepared by reacting a polybasic acid or anhydride with the free hydroxyl groups in the 1,3,2-dioxaphosphorinane ring of phosphonic acid.

Both alkyl and aryl phosphates provide a modest level of flame retardance to styrene crosslinked polyester systems. Oxygen Index increases at a rate of about 1.5 units per percent phosphorus present in the complete formulation. Thus, use of organic phosphates as flame retardants as the sole active constituent has been very limited since relatively large quantities are required to attain even a modest level of flame resistance. Such styrene-containing systems normally employ chlorine or, more recently, bromine-containing polyesters which, when synergized with antimony oxide, can provide a very high level of flame resistance.

In accordance with the present invention, it has now been discovered that phosphate esters containing at least one alkyl ester group are rendered much more effective as flame retardants for styrene crosslinked polyesters when used in conjunction with diallyl maleate. It is noteworthy that diallyl maleate in the absence of alkyl phosphate causes only a slight elevation of the Oxygen Index amounting to approximately one unit per ten parts of diallyl maleate added to a hundred of resin. Only alkyl phosphates are so affected although a mixed alkylaryl phosphate (octyl diphenyl phosphate) gives similar results.

The flame resistance of the styrene crosslinked resin composition will vary with the structure of the alkyl phosphate. If a high level of flame resistance is desired (an Oxygen Index of 26 or higher), it is necessary that sufficient alkyl phosphate be added to the styrene-unsaturated polyester to supply an effective amount, from about 0.5 weight percent to as much as about 5 weight percent of elemental phosphorus (P) based on the weight of styrene-unsaturated polyester.

The diallyl maleate should be added to the styrene-unsaturated polyester in amounts of about 10 to about 40 parts per hundred.

The ratio of diallyl maleate to phosphorus (P) in the styrene-unsaturated polyester system may very within the range of from about 2:1 to about 50:1. Particularly preferred is a styrene-unsaturated polyester system containing from about 0.6 to 1.8 weight percent triethyl phosphate and a weight ratio of diallyl maleate to elemental phosphorus in the range of from about 10:1 to 50:1. When the trialkyl phosphate is tributyl phosphate, the weight percent phosphorus is desirably about 0.8 weight percent and the ratio of diallyl phthalate to phosphorus is about 37:1.

The invention is further illustrated by the following examples in which all quantities are given in parts by weight. The Oxygen Index reported in the examples and tables is determined by test method D2863-76.

EXAMPLE 1

A styrene-unsaturated polyester system is prepared by dissolving a 1:1 maleic-isophthalic acid ester of dipropylene glycol (manufactured and sold by the Diamond Chemical Co. under the trade name DIONE ISO 6421) in an equal weight of styrene to form a 50% solution. To 100 parts of this styrene-unsaturated polyester solution is added diallyl maleate and tributyl phosphate in the amounts indicated in Table I, and 3 parts per hundred of benzoyl peroxide. Each solution is agitated until homogeneous, then deaerated and sealed in quarter inch by eight inch glass tubes for curing. Determinations of curing characteristics by Differential Scanning Calorimetry indicate reaction initiation for this initiator-resin combination occurs in the range of 70° to 75° C. Further, samples cured overnight in this temperature range show no residual energy, i.e., all chemical reactions capable of occurring had indeed occurred during this thermal exposure. All samples were, therefore, cured by placing the quarter inch specimens (in glass tubing) in a water bath maintained at 70° to 75° C. and heated a minimum of 16 hours.

The cured specimens are relatively easily removed from the glass tubes by chilling in ice which, coupled with the contraction during curing, resulted in sufficient shrinkage to cause separation of a solid resin from the glass walls. Oxygen Index measurements are then made on the rod specimens.

Table I lists the results obtained from combinations of diallyl mealeate with various phosphate esters. Of the phosphates employed, triethyl phosphate is most effective.

TABLE I
a. Styrene-Polyester System Containing Tributyl Phosphate-Diallyl Maleate Combinations

| DAM (phr)[1] | TBP (phr) | P (%) | Oxygen Index |
|---|---|---|---|
| 0 | 10 | 1.03 | 21.2 |
| 0 | 30 | 2.61 | 22.3 |
| 10 | 10 | 0.94 | 20.5 |
| 10 | 39 | 2.42 | 23.2 |
| 30 | 10 | 0.81 | 28.0 |
| 30 | 30 | 2.12 | 23.2 |
| 30 | 5 | 1.42 | 22.2 |
| 30 | 15 | 1.17 | 22.2 |
| 20 | 10 | 0.87 | 24.1 |
| 40 | 10 | 0.75 | 23.2 |

[1](phr) = parts per hundred of styrene-unsaturated polyester.

TABLE I
b. Styrene-Polyester Systems Containing Triethyl Phosphate-Diallyl Maleate Combinations

| DAM (phr)[1] | TEP (phr) | P (%) | Oxygen Index |
|---|---|---|---|
| 0 | 0 | 0.0 | 19.0 |
| 10 | 0 | 0.0 | 19.9 |
| 40 | 0 | 0.0 | 22.2 |
| 0 | 10 | 1.50 | 23.0 |
| 0 | 40 | 4.71 | 23.3 |
| 10 | 10 | 1.38 | 24.9 |
| 10 | 40 | 4.40 | 24.9 |
| 40 | 10 | 1.10 | 32.4 |
| 40 | 40 | 3.67 | 23.2 |
| 40 | 5 | 0.56 | 25.2 |
| 40 | 15 | 1.60 | 20.2 |
| 30 | 0 | 0.0 | 23.2 |
| 30 | 5 | 0.61 | 30.4 |
| 30 | 10 | 1.18 | 26.0 |
| 30 | 15 | 1.71 | 20.5 |
| 20 | 5 | 0.66 | 20.5 |
| 20 | 10 | 1.27 | 20.5 |
| 20 | 15 | 1.84 | 28.0 |
| 20 | 20 | 2.36 | 26.0 |

[1](phr) = parts per hundred of styrene-unsaturated polyester.

TABLE I
c. Styrene-Polyester Systems Containing Octyl Diphenyl Phosphate-Diallyl Maleate Combination

| DAM (phr)[1] | Sanitizer 141 (phr) | P (%) | Oxygen Index |
|---|---|---|---|
| 0 | 10 | 0.76 | 20.5 |
| 30 | 5 | 0.31 | 21.2 |
| 30 | 10 | 0.59 | 21.2 |
| 30 | 15 | 0.86 | 21.0 |
| 40 | 5 | 0.29 | 20.2 |
| 40 | 10 | 0.55 | 28.0 |
| 40 | 15 | 0.81 | 26.0 |

TABLE I-continued
d. Isopropyl Phenyl/Phenyl Phosphate-Diallyl Maleate Combinations

| DAM (phr) | Triaryl Phosphate (phr) | P (%) | Oxygen Index |
|---|---|---|---|
| 0 | 10 | 0.68 | 20.5 |
| 0 | 30 | 1.73 | 22.5 |
| 10 | 10 | 0.63 | 20.5 |
| 10 | 30 | 1.61 | 21.2 |
| 30 | 10 | 0.54 | 21.0 |
| 30 | 30 | 1.41 | 21.0 |

[1](phr) = parts per hundred of styrene-unsaturated polyester.

TABLE I
e. Styrene-Polyester Systems Containing Combinations of Diethyl Phosphate [(EtO)$_2$ POOH] With Diallyl Maleate

| DAM (phr)[1] | DEP (phr) | P (%) | Oxygen Index |
|---|---|---|---|
| 0 | 0 | 0 | 19.0 |
| 0 | 10 | 1.77 | 22.2 |
| 0 | 40 | 5.57 | 22.2 |
| 10 | 10 | 1.63 | 23.2 |
| 40 | 10 | 1.30 | 26.8 |
| 10 | 40 | 5.20 | 26.8 |
| 40 | 40 | 4.33 | 29.6 |

[1](phr) = parts per hundred of styrene-unsaturated polyester.

What is claimed is:

1. A flame resistant styrene-unsaturated polyester resin composition comprising said styrene-unsaturated polyester resin in combination with diallyl maleate and about 10 parts per hundred of an alkyl phosphate selected from the group consisting of octyl diphenyl phosphate and tributyl phosphate; the amount of diallyl maleate present in said styrene-unsaturated polyester resin being about 30 parts per hundred when tributyl phosphate is present in said composition and about 40 parts per hundred where octyl diphenyl phosphate is present in said composition.

2. The flame resistant styrene-unsaturated polyester resin composition of claim 1 comprising said styrene-unsaturated polyester resin in combination with about 40 parts per hundred of diallyl maleate and about 10 parts per hundred of octyl diphenyl phosphate.

3. The flame resistant styrene-unsaturated polyester resin composition of claim 1 comprising said styrene-unsaturated polyester resin in combination with about 30 parts per hundred of diallyl maleate and about 10 parts per hundred of tributyl phosphate.

4. The method of improving the flame resistance of a styrene-unsaturated polyester resin which comprises adding to said styrene-unsaturated polyester resin, prior to polymerization diallyl maleate and about 10 parts per hundred of an alkyl phosphate selected from the group consisting of octyl diphenyl phosphate and tributyl phosphate; the amount of diallyl maleate present in said styrene-unsaturated polyester resin being about 30 parts per hundred when tributyl phosphate is present in said composition and about 40 parts per hundred when octyl diphenyl phosphate is present in said composition; and heating the mixture to polymerization temperature in the presence of a catalyst.

5. The method of claim 4 wherein there is added to said styrene-unsaturated polyester resin, prior to polymerization about 40 parts per hundred of diallyl maleate and about 10 parts per hundred of octyl diphenyl phosphate.

6. The method of claim 4 wherein there is added to said styrene-unsaturated polyester resin, prior to polymerization about 30 parts per hundred of diallyl maleate and about 10 parts per hundred of tributyl phosphate.

* * * * *